US008260590B2

(12) United States Patent
Gu et al.

(10) Patent No.: US 8,260,590 B2
(45) Date of Patent: Sep. 4, 2012

(54) METHOD AND SYSTEM FOR MODELING THREE-DIMENSIONAL SMOKE PROPAGATION ANIMATION

(75) Inventors: Ji Gu, Shanghai (CN); Zhao Xia Jin, Shanghai (CN); Tom Plocher, Hugo, MN (US)

(73) Assignee: Honeywell International Inc., Morristown, NJ (US)

( * ) Notice: Subject to any disclaimer, the term of this patent is extended or adjusted under 35 U.S.C. 154(b) by 303 days.

(21) Appl. No.: 12/432,396

(22) Filed: Apr. 29, 2009

(65) Prior Publication Data

US 2010/0280799 A1 Nov. 4, 2010

(51) Int. Cl.
G06F 7/48 (2006.01)
(52) U.S. Cl. ........................ 703/5; 703/6; 703/9; 340/628
(58) Field of Classification Search ................. 703/6, 9, 703/5; 701/6, 9, 209; 340/628
See application file for complete search history.

(56) References Cited

U.S. PATENT DOCUMENTS

| | | | |
|---|---|---|---|
| 6,266,071 B1 * | 7/2001 | Stam et al. ................... 345/473 |
| 7,479,963 B2 * | 1/2009 | Lischinski et al. ........... 345/474 |
| 7,647,214 B2 * | 1/2010 | Song et al. ....................... 703/2 |
| 7,683,793 B2 * | 3/2010 | Li et al. .......................... 340/628 |
| 2007/0132756 A1 * | 6/2007 | Plocher et al. ............... 345/420 |
| 2008/0157984 A1 | 7/2008 | Li et al. .......................... 340/584 |
| 2008/0248450 A1 | 10/2008 | Li et al. .......................... 434/226 |
| 2009/0184830 A1 * | 7/2009 | Watabe et al. ............... 340/628 |
| 2010/0057354 A1 * | 3/2010 | Chen et al. .................... 701/209 |
| 2010/0204969 A1 * | 8/2010 | Hariharan et al. ............... 703/2 |

OTHER PUBLICATIONS

Zhao et al, Y. Voxels on Fire, IEEE, Visualization, 2003, pp. 271-278.*
Staubli et al, O. Volume Rendering of Smoke Propagation CFD Data, IEEE, Visualization, pp. 335-341.*
Novozhilov, V. Computational Fluid Dynamics Modeling of Compartment Fires, Progress in Energy and Combustion Science, vol. 27, No. 6, 2001, pp. 611-666.*

(Continued)

*Primary Examiner* — Russell Frejd
(74) *Attorney, Agent, or Firm* — Kermit D. Lopez; Luis M. Ortiz; Tuesday A. Kaasch (57) ABSTRACT

A method and system for modeling a three-dimensional smoke propagation animation system. The animation system can be configured to include a particle system manager, a compartment manager, a state variable manager, a three-dimensional space outline rendering module, and a three-dimensional smoke animation rendering module. The particle system manager creates and updates an existing particle system based on an input script and data from the state variable manager. The state variable manager loads smoke propagation data and provides smoke information to the particle system manager to create and update the particle system and space outline. The compartment manager creates a three-dimensional outline with respect to each compartment space from a compartment data and updates the status of the existing three-dimensional outlines based on information from the state variable manager. A final three-dimensional smoke propagation animation can then be rendered by the three-dimensional smoke animation rendering module.

17 Claims, 12 Drawing Sheets

OTHER PUBLICATIONS

Chow et al, W.K. A New Model on Simulating Smoke Transport with Computational Fluid Dynamics, Building and Environment, vol. 39, No. 6, Jun. 2004, pp. 611-620.*

Hastings et al, E. NEAT Particles: Design, Representation, and Animation of Particle System Effects, IEEE Symposium on Computational Intelligence and Games, 2007, pp. 154-160.*

Zhuo et al., N.W. Real Time Dense Smoke Simulation Based Particle System, IEEE International Symposium on Intelligent Information Technology Application Workshops, 2008, pp. 809-813.*

Tate et al, D.L. Using Virtual Environments to Train Firefighters, IEEE Computer Graphics and Applications, 1997, pp. 23-29.*

Hua et al, Development of a Hybrid Field and Zone Model for Fire Smoke Propagation Simulation in Buildings, Fire Safety Journal, Elsevier, vol. 40, No. 2, Mar. 2005, pp. 99-119.*

Forney et al, Understanding Fire and Smoke Flow Through Modeling and Visualization, IEEE Computer Graphics and Applications, vol. 23, No. 4, Jul. 2003, pp. 6-13.*

* cited by examiner

```
material SmokeMaterial
{
    technique
    {
        pass
        {
            lighting off
            depth_write off
            scene_blend alpha_blend
            texture_unit
            {
                texture smoke.png
            }
        }
    }
}
```

FIG. 4

```
system SmokeScript
{
    technique      smoke
    {
        material SmokeMaterial
        emitter Box
        {
            position         168.75 5 60
            box_em_width     6.5
            box_em_height    6
            box_em_depth     1
        }
        affector Box Collider
        {
            position              171.25 5 59.25
            box_collider_width    30
            box_collider_height   10
            box_collider_depth    27
            collision_intersectionpoint
            collision_typebounce
        }
        affector Colour
        {
            colour_aff_time_colour 0 1 1 0
        }
    }
}
```

| Time Fraction | () SmokeFeature | | | |
|---|---|---|---|---|
| 1  0 | SmokeFeature(1) | | | |
| | | =Compartment ID | =Source ID | =Density Level | =Temperature Level |
| | | 1  59 | 0 | 1 | 1 |
| 2  60 | SmokeFeature(4) | | | |
| | | =Compartment ID | =Source ID | =Density Level | =Temperature Level |
| | | 1  59 | 0 | 2 | 2 |
| | | 2  60 | 59 | 1 | 1 |
| | | 3  79 | 59 | 2 | 2 |
| | | 4  32 | 59 | 1 | 1 |
| 3  100 | SmokeFeature(7) | | | |
| | | =Compartment ID | =Source ID | =Density Level | =Temperature Level |
| | | 1  59 | 0 | 4 | 3 |
| | | 2  60 | 59 | 2 | 2 |
| | | 3  32 | 59 | 2 | 2 |
| | | 4  31 | 32 | 1 | 1 |
| | | 5  11 | 32 | 1 | 1 |
| | | 6  61 | 60 | 1 | 1 |
| | | 7  119 | 79 | 1 | 1 |
| 4  120 | SmokeFeature(12) | | | |
| | | =Compartment ID | =Source ID | =Density Level | =Temperature Level |
| | | 1  59 | 0 | 6 | 4 |
| | | 2  32 | 59 | 3 | 3 |
| | | 3  60 | 59 | 3 | 3 |
| | | 4  79 | 59 | 3 | 3 |
| | | 5  31 | 32 | 2 | 2 |
| | | 6  11 | 32 | 2 | 2 |
| | | 7  12 | 11 | 1 | 1 |
| | | 8  10 | 11 | 2 | 2 |
| | | 9  61 | 60 | 2 | 2 |
| | | 10  119 | 79 | 1 | 1 |
| | | 11  118 | 119 | 2 | 2 |
| | | 12  120 | 119 | 1 | 1 |

METHOD AND SYSTEM FOR MODELING THREE-DIMENSIONAL SMOKE PROPAGATION ANIMATION

TECHNICAL FIELD

Embodiments are generally to regional monitoring and alarm systems. Embodiments are also related to methods and systems for modeling three-dimensional smoke propagation animation.

BACKGROUND OF THE INVENTION

Computational methods have been developed for modeling fire spread smoke transport and path for usages such as, for example, studies of fire dynamics, development of emergency procedures in advance of emergency situation, and so forth. Regional monitoring systems such as, for example, fire detection and monitoring systems, are increasingly being required for implementation in multi-story buildings. Such systems can provide information related to fire conditions on various floors or regions of a multi-story building. The information can be coupled to a fire alarm control unit, which may be located in, for example, a lobby area or other easily accessible area so as to be readily available to a first responder.

Currently, several fire and smoke modeling and path prediction methods based on computational fluid dynamics (CFD) data have been implemented as a result of traditional off-line modeling of fire spread and smoke transport. Such approaches are capable of predicting the fire and smoke propagation paths. Information can then be transmitted as input data to an evacuation route planning program. Such methods, however, are usually not suitable for real-time applications in a fire scene and can effectively impact and facilitate the emergency planning and development of evacuation routes in a later emergency situation.

Based on the foregoing, it is believed that a need exists for an improved real time smoke propagation system and method. A need also exist for modeling a three-dimensional smoke propagation animation to visualize a real-time fire and smoke propagation and to facilitate emergency planning, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved real time smoke propagation system and method.

It is another aspect of the present invention to provide an improved method and system for modeling a three-dimensional smoke propagation animation for visualization of real-time fire and smoke propagation and to facilitate emergency planning.

The aforementioned aspects and other objectives and advantages can now be achieved as described herein. A method and system are disclosed for modeling three-dimensional smoke propagation animation and visualizing a real-time fire and smoke propagation thereof and for facilitatating an emergency planning within a defined area. The animation system can be configured to include a particle system manager, a compartment manager, a state variable manager, a three-dimensional space outline rendering module, and a three-dimensional smoke animation rendering module.

The particle system manager creates and updates an existing particle system based on an input script and data obtained from the state variable manager and the compartment manager. The state variable manager functions as a state storage module. The state variable manager parses smoke propagation data and provides information to the particle system manager to create and update the particle system. The state variable manager also provides smoke information to the compartment manager to depict and update a three-dimensional outline. The smoke propagation data includes propagation sequence information and smoke behavior data associated with each compartment within a pre-defined time interval. The smoke propagation data can be obtained from a smoke propagation prediction unit. The smoke behavior includes, for example, smoke density level data, temperature level information, and smoke source data, which refers to the compartment from which smoke flows therein.

The compartment manager loads two-dimensional geometry data in order to generate a three-dimensional outline for each compartment space from the compartment data. The compartment manager updates the status of the existing three-dimensional outlines based on information obtained from the state variable manager. The compartment manager is also capable of updating the color of the three-dimensional outline of a compartment, which indicates the temperature. The compartment data generally includes the information of each compartment in the prediction region.

The input script from a particle system script library includes predefined scripts such as smoke particle script and fire particle script, to facilitate the creation of the particle system when modeling natural phenomenon such as smoke, fire, air flow, etc. The particle script is capable of implementation as configuration files for quick setup and efficient adjustment and management. By loading different scripts, the particle system manager can create the particle system to animate corresponding phenomenon. A final three-dimensional space outline can be rendered by the three-dimensional space outline rendering module and a final three-dimensional smoke animation can be rendered via the three-dimensional smoke animation rendering module. The smoke propagation animation can be realized by updating the smoke particle system of each compartment and ensure that the smoke status matches the smoke propagation data at each time fraction.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
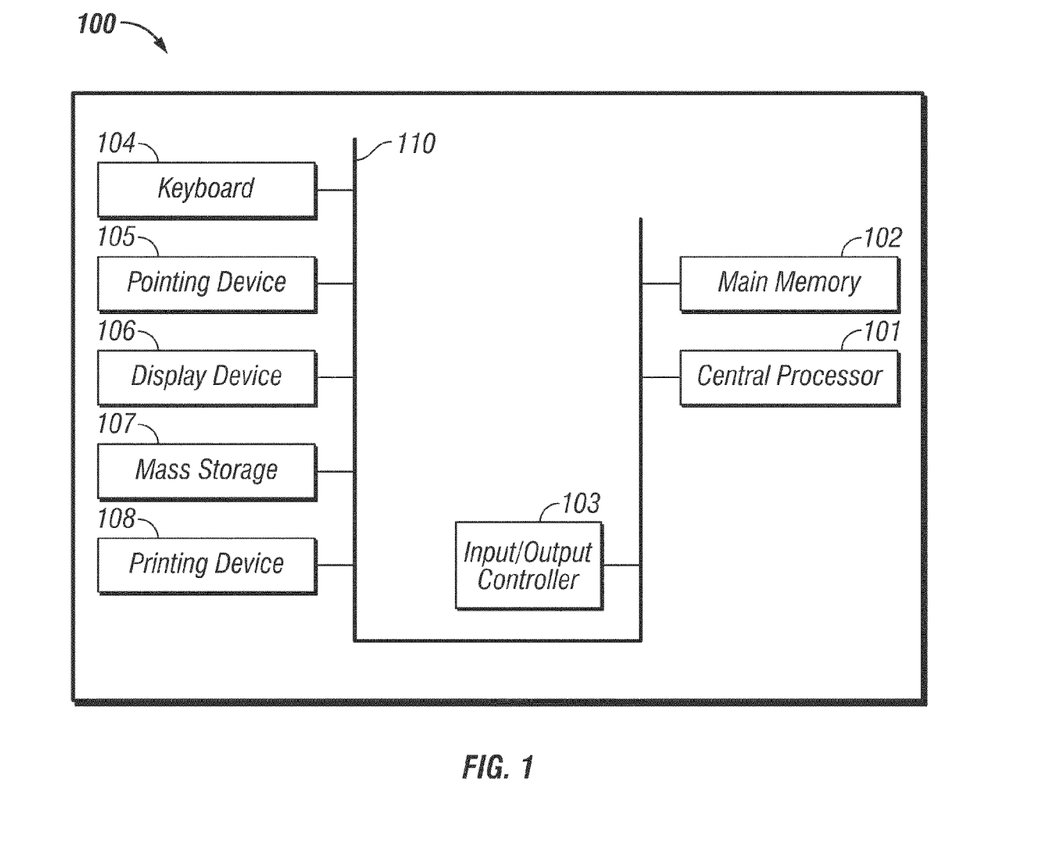
FIG. 1 illustrates a data-processing system in which the present invention may be embodied.

FIG. 1 is provided as exemplary diagrams of data processing environments in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied and/or implemented in the context of a data-processing system 100 that generally includes a central processor 101, a main memory 102, an input/output controller 103, an input device such as, for example, a keyboard 104, a pointing device 105 (e.g., mouse, track ball, pen device, or the like), a display device 106, and a mass storage 107 (e.g., hard disk). Additional input/output devices, such as a rendering device 108, may be utilized in association with the data-processing system 100 as desired. As illustrated, the various components of the data-processing system 100 communicate through a system bus 110 or similar architecture. It is important to note that, although the embodiments are described in the context of a fully functional data-processing system (e.g., a computer system), those skilled in the art will appreciate that the mechanisms of the embodiments described herein are capable of being distributed as a program product in a variety of forms.

Figure 2:
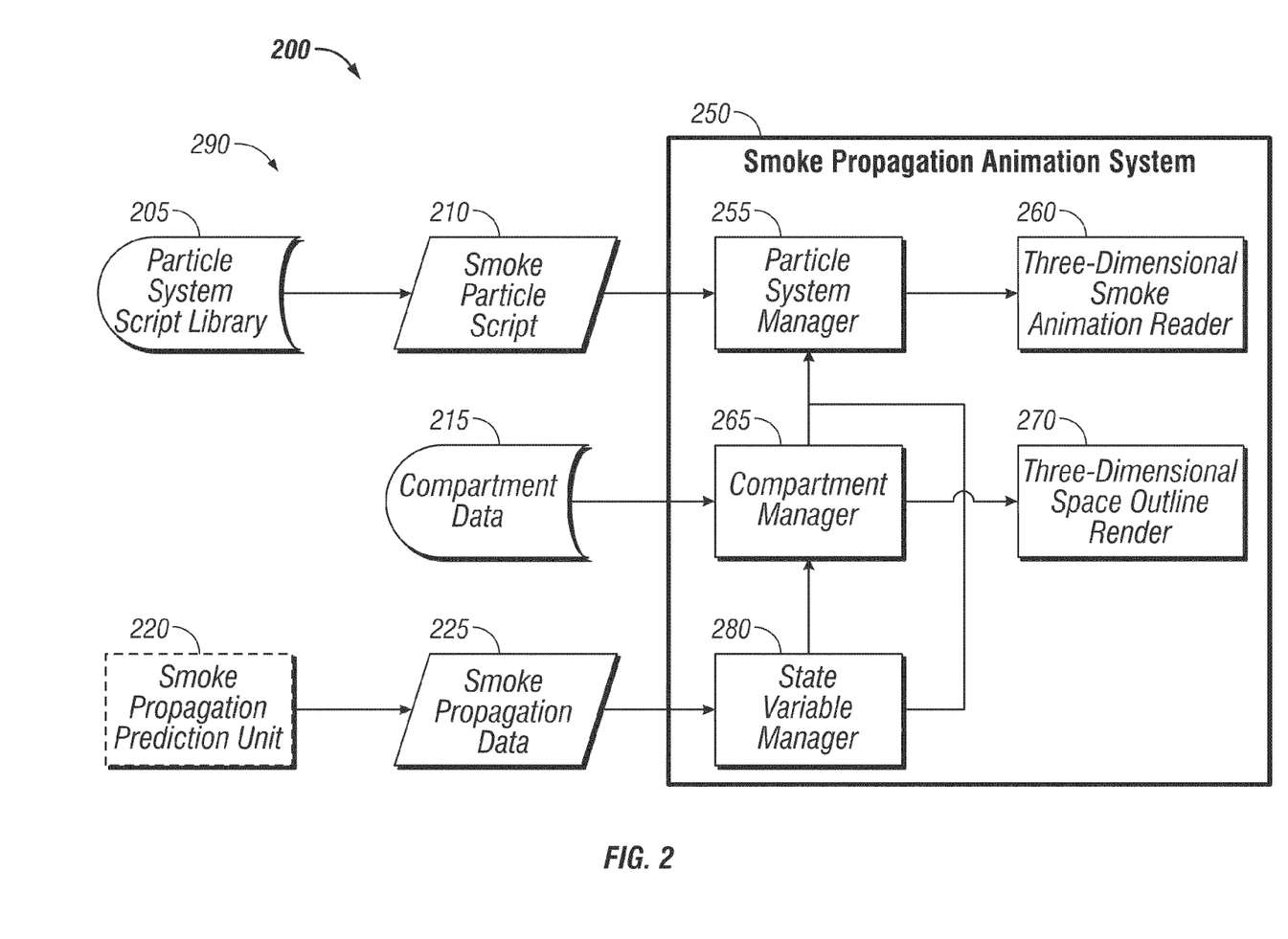
FIG. 2 illustrates a block diagram of a smoke propagation animation system for modeling a three-dimensional smoke propagation animation in accordance with an embodiment.

FIG. 2 illustrates a block diagram of a smoke propagation animation system 200 for modeling a three-dimensional smoke propagation animation 750, in accordance with an embodiment. Note that in FIGS. 1-13, identical or similar blocks are generally indicated by identical reference numerals. The smoke propagation animation system 200 can be utilized to visualize real-time fire and smoke propagation in three-dimensional animations in order to facilitate emergency planning and to improve fire safety. The smoke propagation animation system 200 can be utilized within a defined area such as, for example, a large facility, shopping mall, airport or the like. The smoke propagation animation system 200 includes a particle system manager 255, a compartment manager 265, a state variable manager 280, a three-dimensional animation rendering module 260, and a three-dimensional space outline rendering module 270.

The particle system manager 255 collects data from a particle system script library 205, the compartment manager 265, and the state variable manager 280 for creating and/or updating the status of a particle system 290. The particle system script library 205 includes predefined scripts such as smoke particle script 210, fire particle script, etc. to facilitate the creation of the particle system 290 when modeling nature phenomenon such as smoke, fire, air flow, etc. The particle script 210 works as configuration files for quick setup, easy adjustment and management. By loading different scripts, the particle system manager 255 can create the particle system 290 to animate corresponding phenomenon.

The state variable manager 280 operates as a state storage module, which can parse smoke propagation data 225 and provides information to the particle system manager 255 to create and update the particle system 290. The smoke propagation data 225 includes a propagation sequence and smoke behavior of each compartment within a pre-define time interval. The smoke propagation data 225 can be obtained from a smoke propagation prediction unit 220. The smoke behavior includes smoke's density level, temperature level, and smoke source which refer to the compartment from which smoke flows in. The particle system 290 can be utilized to obtain the smoke propagation path and density of the smoke.

The data from the particle system manager 255 can then be loaded into the three-dimensional animation rendering module 260 for generating three-dimensional smoke propagation animation 750. The compartment manager 265 loads two-dimensional geometry data and generates a three-dimensional outline 550 for each compartment from the compartment data 215. The compartment manager 265 updates the status of the existing three-dimensional outlines 550 based on information from the state variable manager 280. The compartment manager 265 also updates the color of three-dimensional outline 550 of a compartment, which indicates the temperature.

The compartment manager 265 comprises data related to one or more compartments in a smoke prediction region. A final three-dimensional space outline 700 can be rendered by the three-dimensional space outline rendering module 270 and a final three-dimensional smoke animation 750 can be rendered by the three-dimensional smoke animation rendering module 260. The smoke propagation animation can be realized by updating the smoke particle system 290 of each compartment and ensure that at each time fraction, the smoke status matches the smoke propagation data 225.

Figure 3:
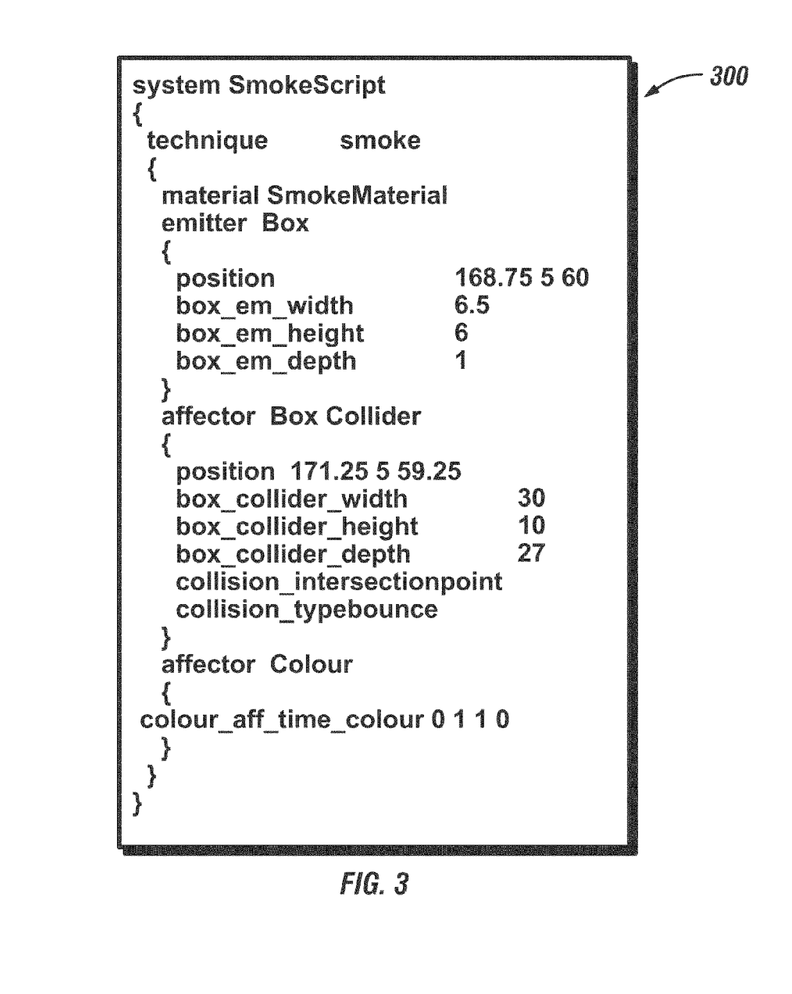
FIGS. 3-4 illustrate an exemplary predefined particle script in accordance with aspects of some embodiments.
Figure 4:
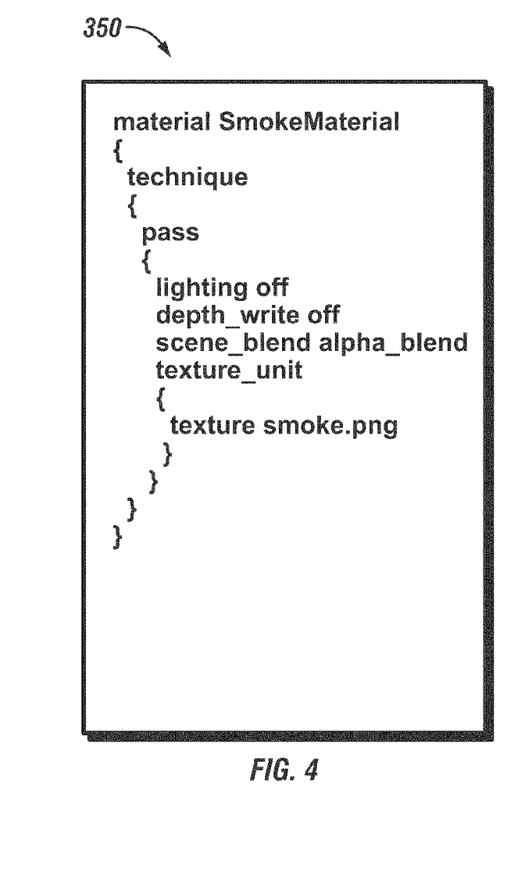

FIGS. 3-4 illustrate an exemplary predefined particle script 300 and 350 in accordance with aspects of some embodiments. The particle script 300 and 350 functions as configuration files for quick setup, easy adjustment and management. The predefined smoke script 300 includes a configuration data, which can be utilized for assigning parameters of the particle system 290. The configuration data includes information such as, for example, data indicative of materials, emitters, affectors, etc. The materials determine, for example, the final appearance of each particle of the particle system 290. Emitters define the shape of emitter such as point, box, and sphere with its basic attributes. Affecters define functions, which may change the behavior of the particle system 290 such as scale, color or collision type. The particle scripts 300 and 350 can be implemented as, for example, plain text files, which may be edited in any standard text editor.

The smoke script 300 provides data indicative of, for example, a material, an emitter, and two affectors. The script 300 utilizes "SmokeMaterial" as the material script 350, as depicted in FIG. 4. The material script 350 utilizes a blending technique to reach a semi-transparent effect with a texture named "smoke.png". The predefined script 300 includes box as the emitter shape and the basic attributes such as position and size can be pre-assigned. One of the affectors is "Box-Collider" which generates an invisible box outside the particle system 290 for providing collision detection and collision effects for the smoke particles. Also, the attributes (e.g., position, width, height, breadth, collision intersection point, and collision type) of the "BoxCollider" are pre-assigned, as indicated in the predefined script 300. The other affector is "Color", which can be utilized to change the color of each smoke particle over its lifetime based on a time fraction 580. "Color aff_time_color 0 1 1 0" indicates that from the beginning of the lifetime, the smoke particle's RGB color is (1, 1, 0). The information of smoke and/or fire can be loaded in the particle system library 205 for predicting the fire and smoke propagation.

Figure 5:
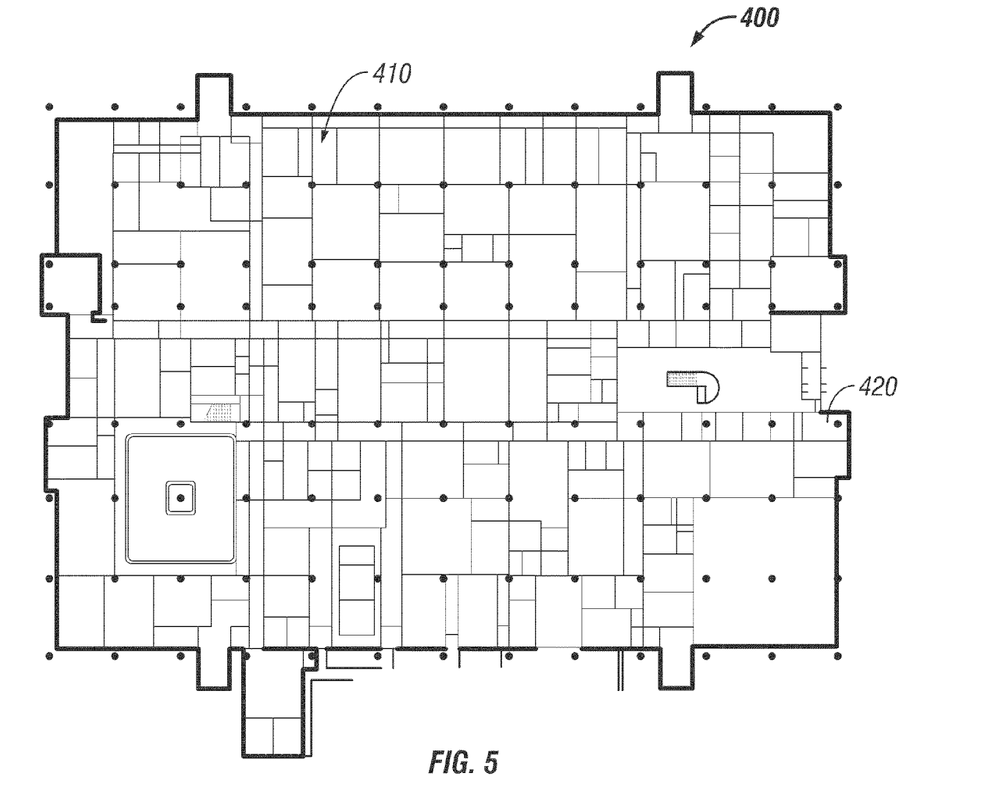
FIG. 5 illustrates a two-dimensional floor plan view segmented by compartments in accordance with an embodiment.
Figure 6:
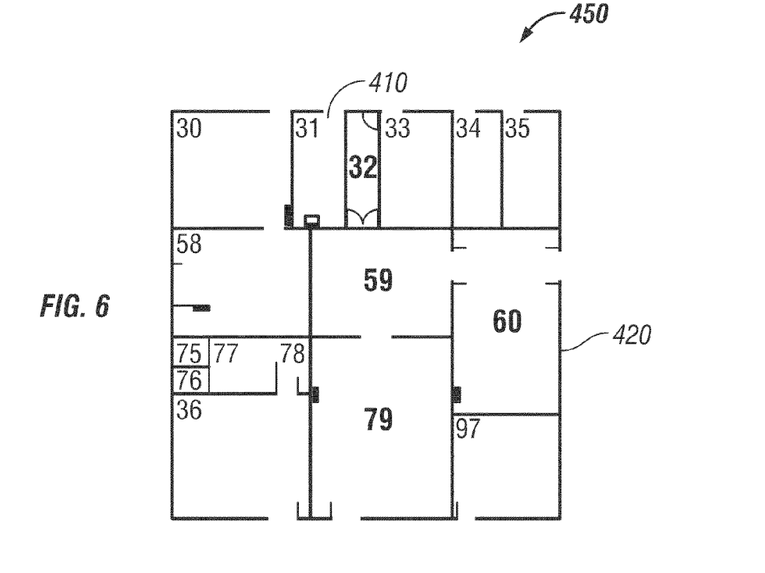
FIG. 6 illustrates a two-dimensional floor plan view of a compartment in accordance with an embodiment.

FIG. 5 illustrates a two-dimensional floor plan view 400 segmented by compartments 420, in accordance with an embodiment. Again as reminder, in FIGS. 1-13, identical or similar blocks are generally indicated by identical reference numerals. A region such as a floor plan can be segmented into compartments. Note that the compartment generally refers to a room, stairwell, hallway, and the like associated with the floor. The two-dimensional floor plan view 400 segmented into a group of compartments 420 can be considered as a unit of the smoke propagation prediction. Each compartment 420 can be assigned an ID 410 for unique identification. FIG. 6 illustrates a two-dimensional floor plan view 450 related to a compartment 59, in accordance with an embodiment. The compartment 59 has three adjacent compartments such as compartment 32, compartment 60, and compartment 79.

Figure 7:
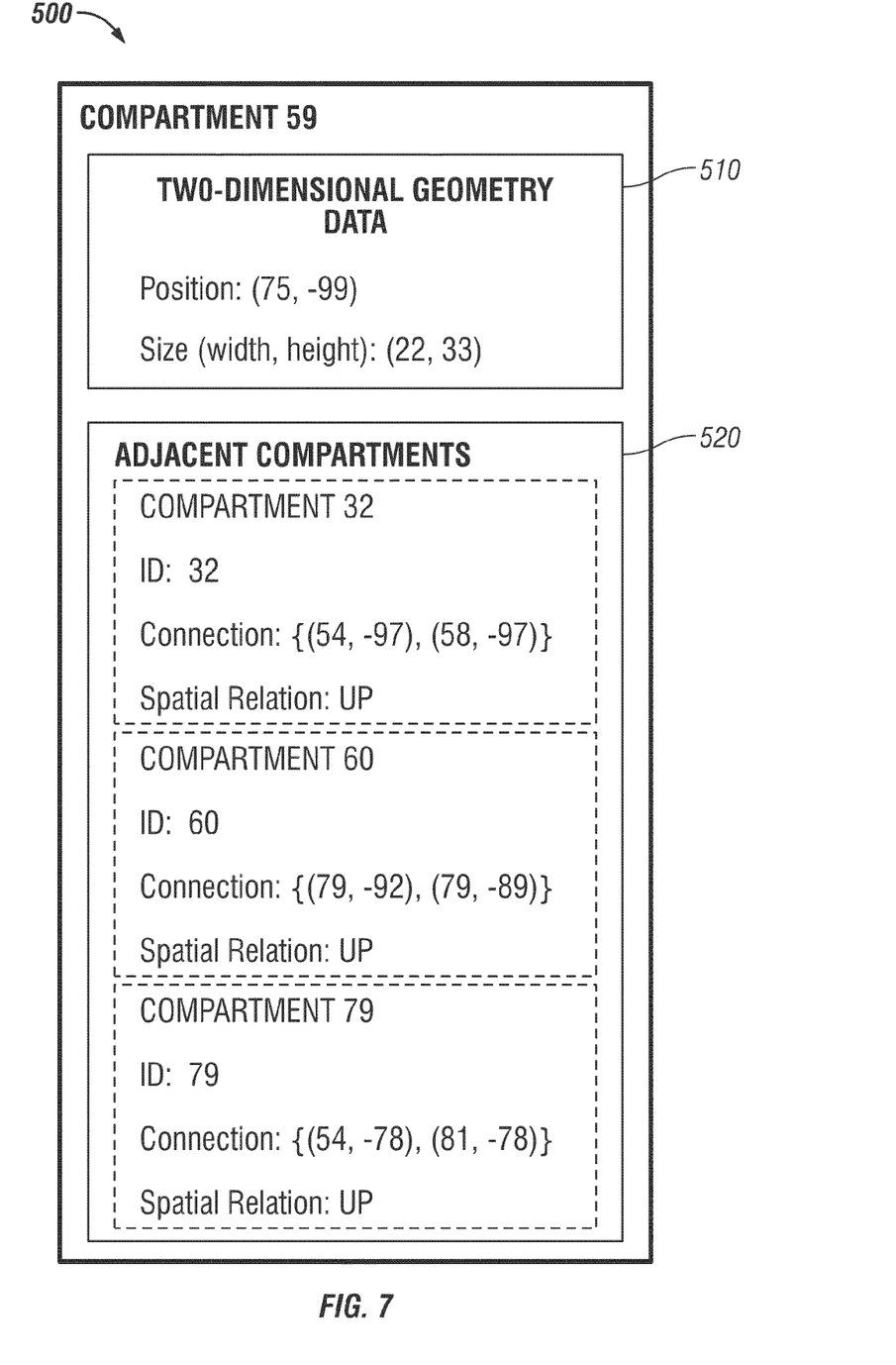
FIG. 7 illustrates a database record related to the compartment depicted in FIG. 6 in accordance with an embodiment.

FIG. 7 illustrates an example of a database record 500 related to the compartment 59 depicted in FIG. 6, in accordance with an embodiment. The compartment data 215 with respect to each compartment 420 includes a two-dimensional geometry data 510 and adjacent compartments data 520. The two-dimensional geometry data 510 comprises attributes related to the compartment 59 such as position and size. The adjacent compartments data 520 include ID, a spatial relation, and a geometry data of related entrance or exit (door or window) acting as a connection.

Figure 8:
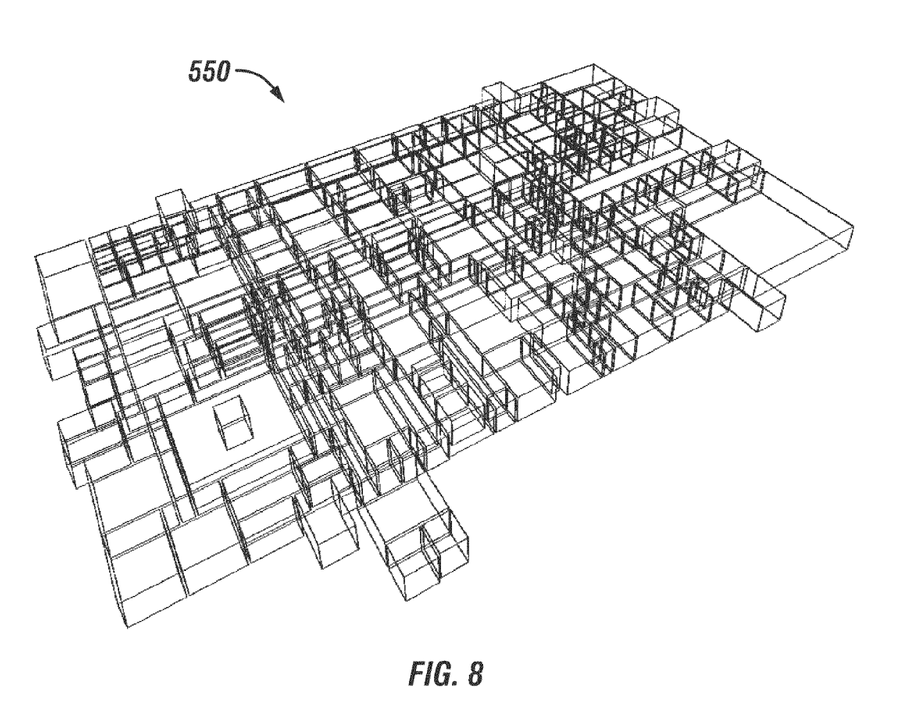
FIG. 8 illustrates a three-dimensional outline of the compartments in accordance with an embodiment.

FIG. 8 illustrates a three-dimensional outline 550 of the compartments 420 in the smoke predicted region, in accordance with an embodiment. The compartment manager 265 loads two-dimensional geometry data and generates the three-dimensional outline 550 for each compartment 420 from the compartment data 215. The state variable manager 280 also provides the smoke information to the compartment manager 265 to show and update the three-dimensional outline 550. The compartment manager 265 loads the two-dimensional geometry data 510 from the compartment data 215 to the three-dimensional space outline rendering module 270 for rendering the three-dimensional outline 550.

Figure 9:
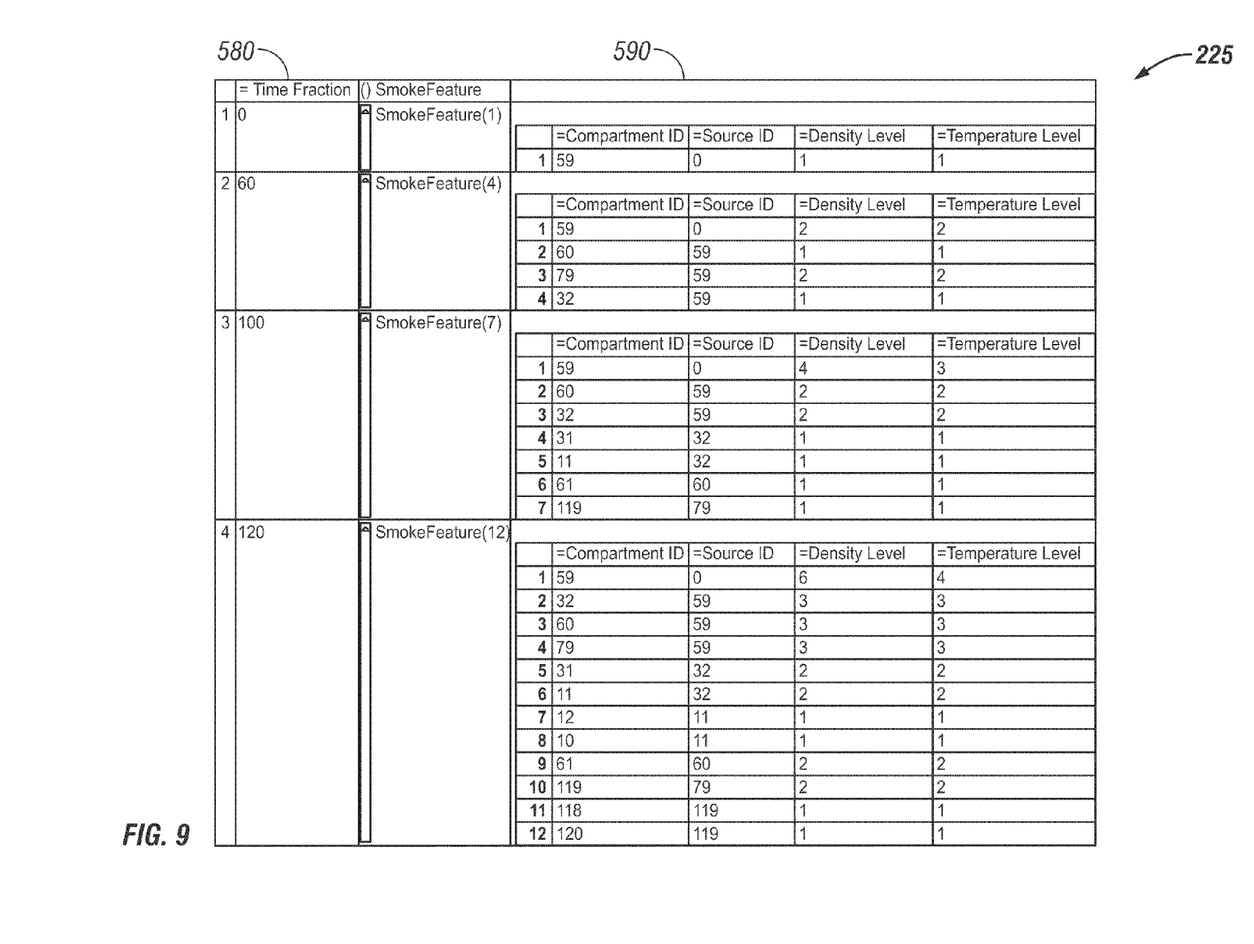
FIG. 9 illustrates a table of smoke propagation data associated with each compartment in accordance with an embodiment.

FIG. 9 illustrates a table of smoke propagation data 225 related to the compartments 420, in accordance with an embodiment. The smoke propagation data 225 for the compartments 420 can be obtained from the smoke propagation prediction unit 220. The smoke propagation data 225 includes propagation sequence and smoke feature 590 of each compartment 420 within a pre-define time interval 580. The smoke feature 590 includes smoke's density level, temperature level, and smoke source such as compartment ID 410.

The smoke source refers to the compartment (e.g. compartment 410) from which smoke flows. The state variable manager 280 also loads the smoke propagation data 225 and provides the smoke information to the particle system manager 255 to create and update the particle system 290 and to the compartment manager 265 to show and update the three-dimensional outline 550.

Figure 10:
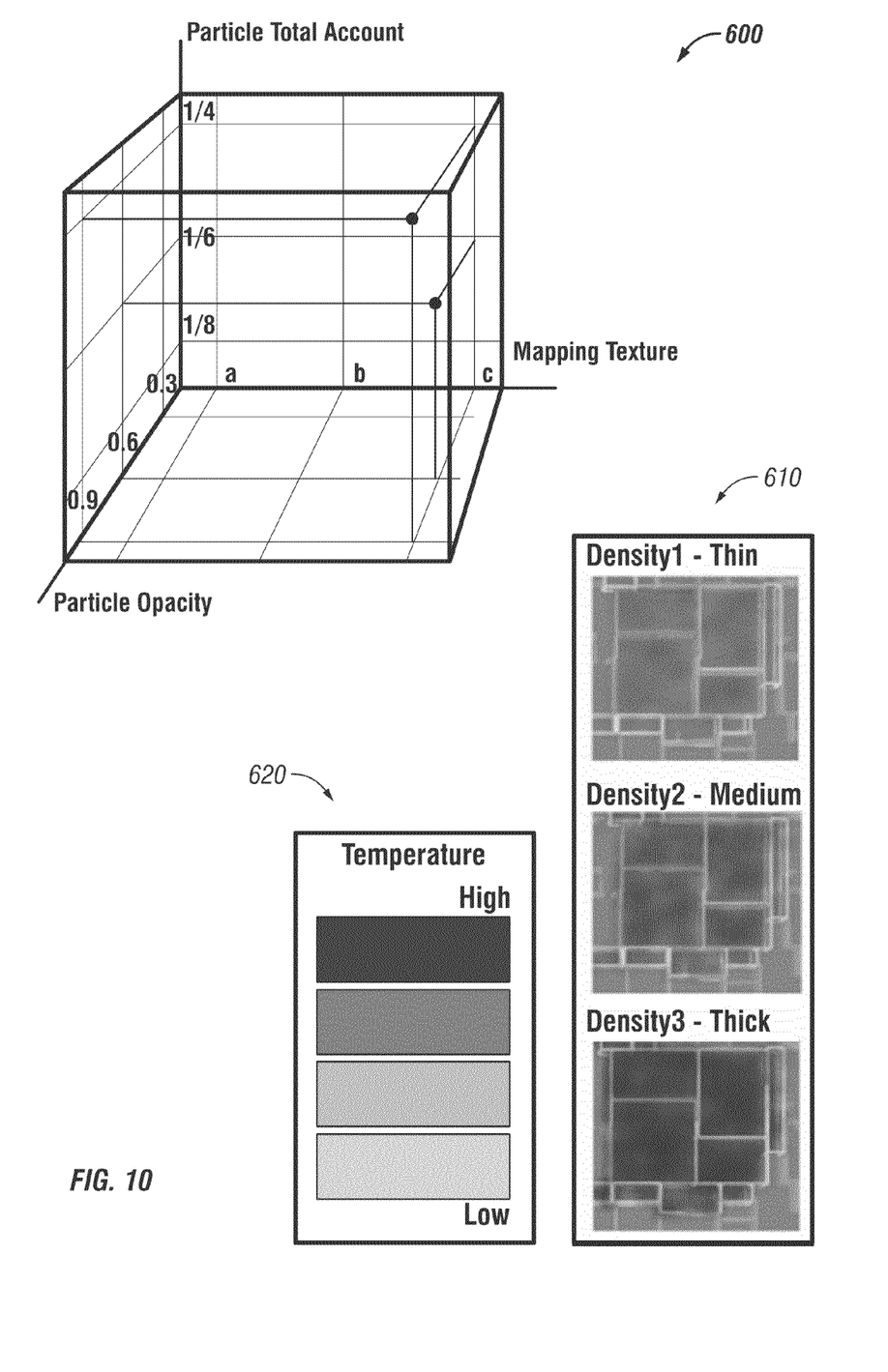
FIG. 10 illustrates density and temperature legend of smoke associated with each compartment in accordance with an embodiment.

FIG. 10 illustrates a density and temperature legend 600 of smoke in a compartment, in accordance with an embodiment. FIG. 10 illustrates a screen shot or image 610 of different density levels of the smoke particles such as density 1, density 2 and density 3 and color-coding thereof for various temperatures. The smoke propagation prediction unit 220 can predict the smoke propagation by locating the particle emitter to the connection point such as a door or a window according to the source ID from the smoke propagation data 225. The direction of the emitter can be easily determined by the spatial relation between the target compartment and the source compartment from the compartment data 215. The visual transparency of the particle system 290 indicates the density level of the smoke.

The level of transparency can be pre-defined by adjusting the following attributes of the particle system 290, transparency of the mapping texture, the total account of particles, and particle opacity. The color legend 620 can also, for example, be pre-defined to indicate the temperature level of the smoke. The box collider's position and size with respect to the three-dimensional outline can be precisely set in order to maintain the smoke within space of the compartment.

Figure 11:
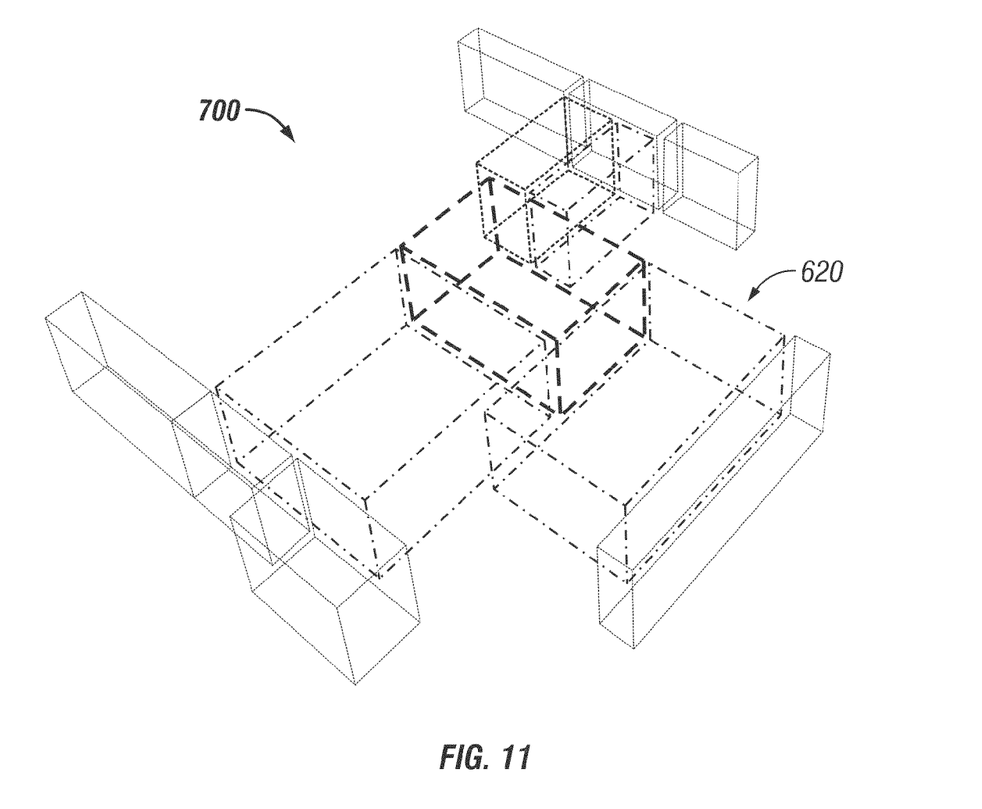
FIG. 11 illustrates a three-dimensional view of the compartment outline with color coding in accordance with an embodiment.

FIG. 11 illustrates a three-dimensional view of the compartment outline 700 with color-coding 620 corresponding to the color-legend 620 shown in FIG. 10, in accordance with an embodiment. Note that in FIG. 11, the color coding 620 is shown in the context of various types of dashed lines or solid lines, which are representative of different types of color coding or shading, which corresponds to the color-legend 620 of FIG. 10. The compartment manager 265 can update the color of three-dimensional outline 550 of a compartment, which indicates the temperature. The three dimensional outline 700 of the compartments 420 in the smoke fire predicted region can constitute color-coding or shading 620 to identify temperature of the compartment. Again, the color-coding or shading 620 depicted in FIG. 11 is analogous or corresponds to the color-legend depicted in FIG. 10. It can be appreciated that a number of different types of color codes or color legends may be utilized to implement the example color legend/coding of FIGS. 10-11. Compartment information may be provided by the compartment manager 265 and the temperature or smoke propagation information can be provided by the state variable manager 280. The final three-dimensional space outline 700 can be rendered by the three-dimensional space outline rendering module 270.

Figure 12:
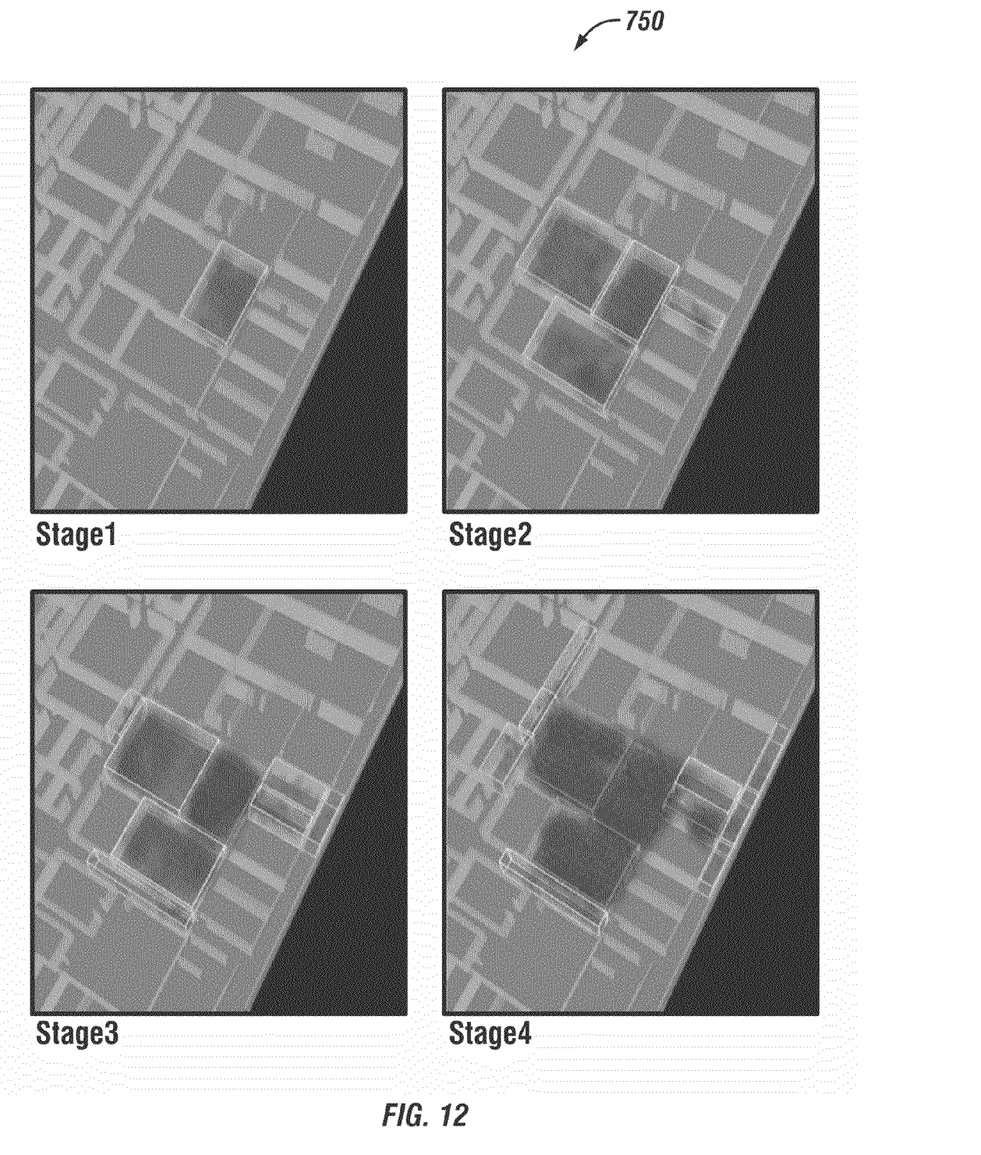
FIG. 12 illustrate a pictorial view of a three-dimensional animation of smoke propagation in the compartments in accordance with an embodiment.

FIG. 12 illustrates a pictorial view of a three-dimensional animation 750 of smoke propagation in the compartments, in accordance with an embodiment. The data from the particle system manager 255 can be loaded into the three-dimensional animation rendering module 260 for three-dimensional smoke propagation animation 750. The three-dimensional animation 750 of smoke propagation illustrates different stages such as stage 1, stage 2, stage 3, and stage 4 of smoke propagation in the compartment. The information related to the smoke propagation can be obtained from the particle system manager 255 and rendered utilizing the three-dimensional rendering module 260.

Figure 13:
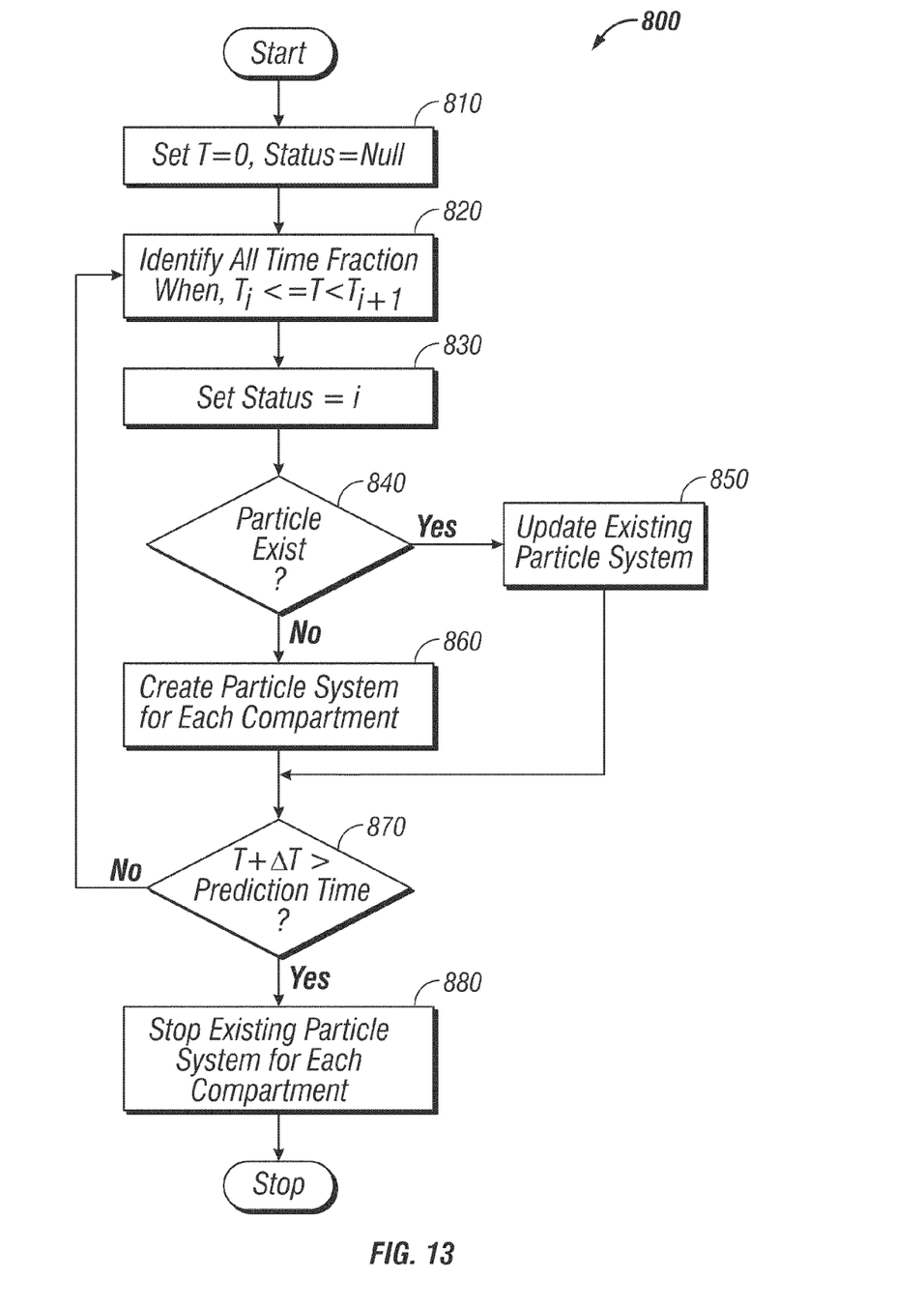
FIG. 13 illustrates a flow chart of operations illustrating logical operational steps of a method for creating and updating a particle system, in accordance with an embodiment.

FIG. 13 illustrates a flow chart of operations illustrating logical operational steps of a method 800 for creating and updating the particle system 290, in accordance with an embodiment. The three-dimensional animation 750 of the smoke propagation can be modeled by creating and/or updating the particle system 290 and by rendering the three-dimensional outline 700. The variables T=0 and status=NULL can be set, as illustrated at block 810. Thereafter, as indicated at block 820, the time fraction 580 can be identified when $T_i<=T<T_{i+1}$. The status can then be set to i, as depicted at block 830. A determination can be made if the particle (e.g. smoke, fire) exists in the defined area, as illustrated at block 840. If the particle exists, the existing particle system 290 can be updated, as depicted at block 850. Otherwise, the particle system 290 can be configured with respect to each compartment, as indicated at block 860. Next, a determination can be made whether T+ΔT exceeds the prediction time, as illustrated at block 870. If T+ΔT exceeds the prediction time, creating or updating the particle system 290 can be stopped, as depicted at block 880. Otherwise, the process can be continued to step 820.

Figure 14:
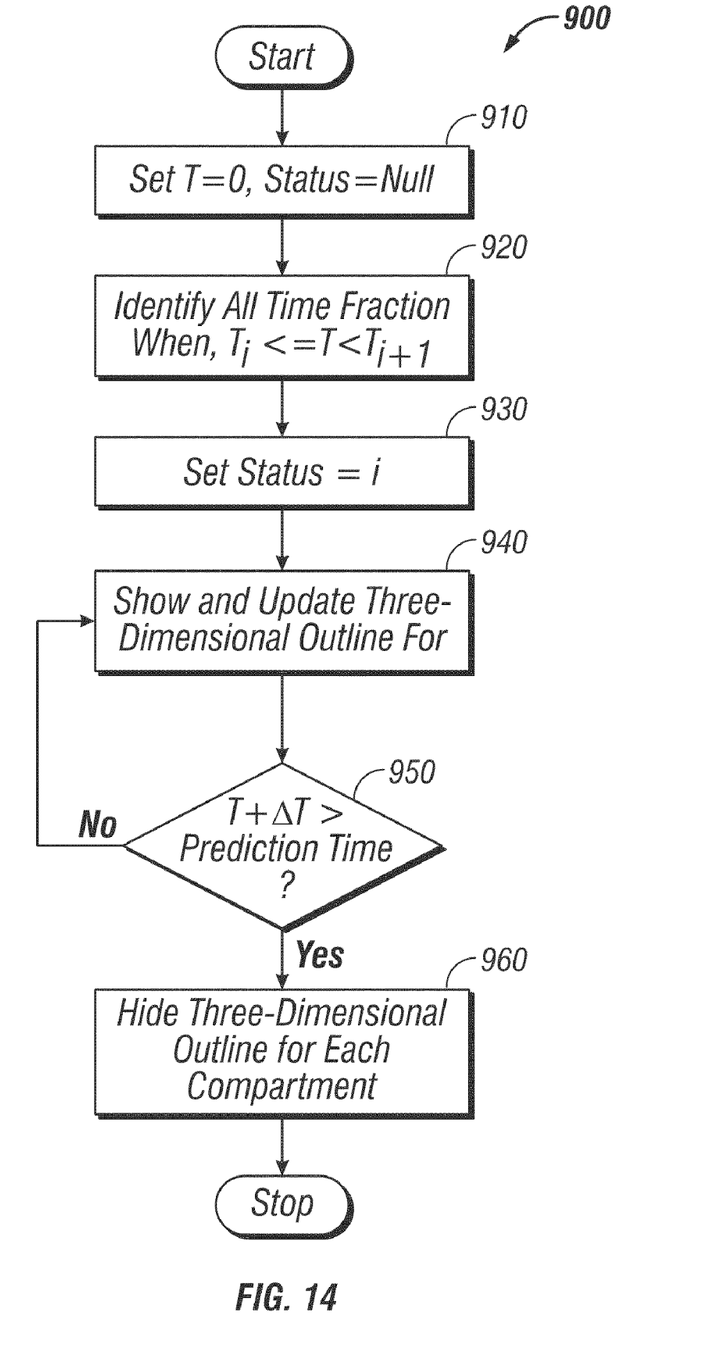
FIG. 14 illustrates a flow chart of operations illustrating logical operational steps of a method for rendering and updating a three-dimensional outline, in accordance with an embodiment.

FIG. 14 illustrates a flow chart of operations illustrating logical operational steps of a method 900 for rendering and updating the three-dimensional outline 700 of the compartments, in accordance with an embodiment. The variables T=0 and status=NULL can be set, as illustrated at block 910. Thereafter, as depicted at block 920, the time fraction 580 can be identified when $T_i<=T<T_{i+1}$. The status can thereof be set to i, as indicated at block 930. The three dimensional outline 700 for each compartment with the fire and smoke propagation can be shown and updated utilizing the three-dimensional outline rendering module 270, as illustrated at block 940.

Next, as indicated at block 950, a determination can be made whether T+ΔT exceeds the prediction time. If T+ΔT does exceed the prediction time, the three-dimensional outline 700 (i.e., for each compartment without a fire and smoke propagation thereof) can be hidden, as depicted at block 960. Otherwise, the process continues to the operation illustrated at block 940. The three-dimensional animation 750 of smoke propagation can be utilized to identify developing fire conditions and to provide individuals in the vicinity of such conditions with information of the smoke and fire propagation in the structure to assist the departure.

Note that the methodology disclosed herein (e.g., methods 800, 900) can be implemented in the context of a computer-useable medium that contains a program product. Programs defining particular functions/instructions such as those depicted in the accompany figures can be delivered to a data storage system or a computer system via a variety of non-transitory signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media, such as computer and telephone networks including Ethernet, the Internet, and like network systems. It should be understood, therefore, that such non-transitory signal-bearing media when carrying or encoding computer readable instructions that direct method functions in the present invention, represent alternative embodiments of the present invention. Further, it is understood that the present invention may be implemented by a system having components in the form of hardware, software, or a combination of software and hardware as described herein or their equivalent.

Thus, the disclosed methodology can be deployed as process software in the context of a computer system or data-processing system such as that depicted, for example, in FIGS. 1-2. The instructions of disclosed instructions can, for example, be stored in, for example, the main memory 102 and/or mass storage 107 of FIG. 1 and then processed via the processor 101.

Along these same lines, it can be appreciated that the various "managers" and components discussed herein can be implemented in the context of one or more "modules". For example, the smoke propagation prediction unit 220, the state variable manager 280, the compartment manager 265, the particle system manager 255, the three-dimensional smoke animation rendering module 260, and the three-dimensional space outline rendering module 270, can be implemented in the form of computer or software modules.

In the computer programming arts, a "module" can be implemented as a collection of routines and data structures that performs particular tasks or implements a particular abstract data type. Modules generally are composed of two parts. First, a software module may list the constants, data types, variable, routines, and the like that that can be accessed by other modules or routines. Second, a software module can be configured as an implementation, which can be private (i.e., accessible perhaps only to the module), and contains the source code that actually implements the routines or subroutines upon which the module is based. Thus, for example, the term module, as utilized herein, generally refers to software modules or implementations thereof. Such modules can be utilized separately or together to form a program product that can be implemented through signal-bearing media, including transmission media and recordable media. One or more modules can therefore be implemented to process the instructions described and illustrated herein.

While the embodiments have been particularly shown and described with reference to one or more embodiments, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for generating real-time smoke and fire propagation models, said method comprising:
    creating a particle system based on an input script and data obtained from a state variable manager and a compartment manager;
    creating and updating particle data based on a predefined particle script and smoke behavior data, wherein said particle data is utilized in generating a three-dimensional animated smoke propagation model and said predefined particle script comprises configuration data for assigning parameters of said particle system;
    obtaining smoke propagation data from a smoke propagation prediction unit, said smoke propagation data comprising propagation sequence information and smoke behavior data associated with each of a plurality of compartments over a predefined time interval;
    parsing said smoke propagation data utilizing said compartment manager and providing parsed data to said particle system;

providing said smoke propagation data and two-dimensional geometry data for each of said plurality of compartments to said compartment manager to depict and update a three-dimensional outline of said plurality of compartments; and generating said three-dimensional animated smoke propagation model utilizing a rendering module.

2. The method of claim 1 wherein said configuration data comprises data indicative of materials, emitters and affectors.

3. The method of claim 2 wherein said smoke behavior comprises at least one of the following types of data:
   a density level of smoke;
   a temperature level; and
   a smoke source, wherein said smoke source references a compartment from which smoke flows.

4. The method of claim 3 further comprising updating a color related to said three-dimensional outline, wherein said color indicates said temperature level.

5. The method of claim 2 wherein said predefined particle script further comprises at least one of the following types of script data:
   a smoke particle script; and
   a fire particle script.

6. The method of claim 2 further comprising updating particle data with respect to each of said pluralities of compartments and ensuring smoke status information thereof matches said smoke propagation data at a particular time fraction.

7. A computer implemented method for generating real-time smoke and fire propagation models comprising:
   a particle system manager for creating and updating a particle system based on an input script and data obtained from a state variable manager and a compartment manager, wherein said data comprises article data based on a predefined particle script and smoke behavior data for generating a three-dimensional animated smoke propagation mode and wherein said predefined particle script comprises configuration data for assigning parameters of said particle system;
   a smoke propagation predictive unit for providing smoke propagation data;
   a state variable manager for parsing said smoke propagation data and providing it to said particle system manager, said state variable manager also provides said smoke propagation data to said compartment manager for depicting and updating a three-dimensional outline where said compartment manager is configured for receiving said smoke propagation data from said state variable manager and for generating a three-dimensional outline for each of a plurality of compartments from compartment data;
   a three-dimensional outline rendering module for rendering a three-dimensional outline of said plurality of compartments; and
   a three-dimensional smoke animation rendering module for rendering said three-dimensional smoke animation model.

8. The computer implemented method of claim 7 wherein said smoke propagation data further comprises information indicative of a propagation sequence and smoke behavior with respect to each of said plurality of compartments within a predefined time interval.

9. The computer implemented method of claim 8 wherein said smoke behavior comprises at least one of the following types of data:
   a density level of smoke;
   a temperature level; and
   a smoke source, wherein said smoke source references one of said plurality of compartments from which smoke flows.

10. The computer implemented method of claim 7 wherein said configuration data comprises data indicative of materials, emitters and affectors.

11. The computer implemented method of claim 10 wherein said predefined particle script comprises at least one of the following types of script data:
    a smoke particle script; and
    a fire particle script.

12. A non-transitory computer-usable medium for generating a real-time smoke and fire propagation model, said computer-usable medium embodying computer program code, said computer program code comprising computer executable instructions configured for:
    creating a particle system based on an input script and data obtained from a state variable manager and a compartment manager;
    creating and updating particle data based on a predefined particle script and smoke behavior data, wherein said particle data is utilized in generating a three-dimensional animated smoke propagation model and said predefined particle script comprises configuration data for assigning parameters of said particle system;
    obtaining smoke propagation data from a smoke propagation prediction unit, said smoke propagation data comprising propagation sequence information and smoke behavior data associated with each of a plurality of compartments over a predefined time interval;
    parsing said smoke propagation data utilizing said compartment manager and providing parsed data to said particle system;
    providing said smoke propagation data and two-dimensional geometry data for each of said plurality of compartments to said compartment manager to depict and update a three-dimensional outline of said plurality of compartments; and
    generating said three-dimensional animated smoke propagation model utilizing a rendering module.

13. The computer-usable medium of claim 12 wherein said configuration data comprises data indicative of materials, emitters and effectors.

14. The computer-usable medium of claim 12 wherein said smoke behavior comprises at least one of the following types of data
    a density level of smoke;
    a temperature level; and
    a smoke source, wherein said smoke source references a compartment from which smoke flows.

15. The computer-usable medium of claim 12 further comprising updating a color related to said three-dimensional outline, wherein said color indicates said temperature level.

16. The computer-usable medium of claim 12 wherein said predefined particle script further comprises at least one of the following types of script data:
    a smoke particle script; and
    a fire particle script.

17. The computer-usable medium of claim 12 further comprising updating particle data with respect to each of said pluralities of compartments and ensuring smoke status information thereof matches said smoke propagation data at a particular time fraction.

* * * * *